United States Patent Office 2,835,672
Patented May 20, 1958

2,835,672
MANUFACTURE OF NEW HYDROCINNOLONES

Jean Druey, Riehen, and Paul Schmidt, Therwil, Switzerland, assignors to Ciba Pharmaceutical Products, Inc., Summit, N. J.

No Drawing. Application September 19, 1955
Serial No. 535,308

Claims priority, application Switzerland April 30, 1953

2 Claims. (Cl. 260—250)

This application is a continuation-in-part of our copending application Serial No. 425,738, filed April 26, 1954.

The present invention relates to a new series of organic compounds. More particularly, this invention is concerned with 2-substituted-4-cyano-5,6,7,8-tetrahydrocinnolones-(3) and methods for their preparation.

The compounds intended to be embraced within the scope of the present invention are the 2-(aliphatic hydrocarbon)-4-cyano-5,6,7,8-tetrahydrocinnolones-(3). These compounds may contain further substituents such as lower alkyl, alkoxy or endoalkylidene groups or halogen atoms, for example methyl, methoxy or endoisopropylidene groups.

As examples of aliphatic hydrocarbon substituents suitable for the 2-position may be given the lower alkyl radicals having from 1 to 6 carbon atoms such as methyl, ethyl, propyl, isopropyl etc. The compound 2-methyl-4-cyano-5,6,7,8-tetrahydrocinnolone-(3) of the formula

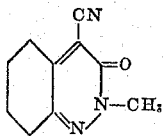

may be cited as an especially suitable compound of this series.

The aforesaid hydrocinnolones are obtained by treating a 4-cyano-5,6,7,8-tetrahydrocinnolone-(3) with an agent capable of introducing an aliphatic hydrocarbon radical, as for example a reactive ester of an unsubstituted aliphatic alcohol, such as a dialkyl sulfate or an alkyl halide. As specific examples, the following may be given: dimethyl sulfate, diethyl sulfate, methyl iodide, methyl bromide, methyl chloride, ethyl iodide, ethyl bromide, propyl iodide, isopropyl iodide and the like.

The reaction of this invention may be carried out either in the presence or absence of a solvent or a condensing agent.

The new compounds are useful as analgesics. They can be used in the form of pharmaceutical preparations in dosage unit form, which contain the active compound in therapeutically effective amount in intimate admixture with a solid diluent or in a solution suitable for enteral, topical or parenteral administration. The manufacture of the pharmaceutical preparations is carried out according to known methods, for example by adding the therapeutically active compound to an excipient or a mixture of excipients. As excipients there are used substances which do not react with the new compounds, for example, water, gelatine, lactose, starches, magnesium stearate, talc, vegetable oils, benzyl alcohols, gums, polyalkylene glycols, petroleum jelly, cholesterol or other known carriers for medicaments. The pharmaceutical preparations may be made up, for example in the form of tablets, dragees, salves, creams or in liquid form as solutions, suspensions or emulsions. If desired they may be sterilized and/or may contain auxiliary substances, such as preserving agents, stabilizing agents, wetting or emulsifying agents, salts for regulating the osmotic pressure or buffers. They may also contain other therapeutically valuable substances, for example, antibacterials.

The amount of the new compounds in the preparations comprising the invention may be varied as long as a sufficient proportion is present to provide a therapeutically effective dose. Thus, in a single dose about 5 mg. to about 500 mg. of the active compound may be present in the various dosage unit forms to obtain a therapeutic effect, as, for example, in the form of tablets or an ampoule for injection.

For example, a tablet of the following composition can be prepared in the usual way:

|  | Mg. |
|---|---|
| 2-methyl-4-cyano-5,6,7,8-tetrahydrocinnolone-(3) | 100 |
| Lactose | 65 |
| Gelatine | 2 |
| Starch | 65 |
| Magnesium stearate | 1 |
| Talc | 17 |
|  | 250 |

The following example illustrates the invention:

Example 13 grams of dimethyl sulfate are slowly introduced in three portions into a solution of 17.5 grams of 4-cyano-5,6,7,8-tetrahydrocinnolone-(3) in 50 cc. of a 2 N-solution of caustic soda. A yellow product soon precipitates, and is filtered off with suction. The precipitate is crystallized from boiling carbon tetrachloride, and in this manner 2-methyl-4-cyano-5,6,7,8-tetrahydrocinnolone-(3) of the formula

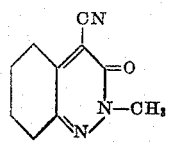

is obtained in the form of white crystals melting at 130–131° C.

What is claimed is:
1. 2-(lower alkyl)-4-cyano-5,6,7,8-tetrahydrocinnolone-(3).
2. The new compound 2-methyl-4-cyano-5,6,7,8-tetrahydrocinnolone-(3).

No references cited.